United States Patent [19]

Augeri et al.

[11] Patent Number: 4,870,703
[45] Date of Patent: Sep. 26, 1989

[54] MAGNETIC DISC MEMORY UNIT

[75] Inventors: James A. Augeri, Middletown; Paul R. Young, Cromwell; David W. Richard, Meriden; David Johnson, Portland, all of Conn.

[73] Assignee: Raymond Engineering Inc., Middletown, Conn.

[21] Appl. No.: 257,186

[22] Filed: Oct. 12, 1988

Related U.S. Application Data

[63] Continuation of Ser. No. 941,820, Dec. 15, 1986, which is a continuation-in-part of Ser. No. 821,101, Jan. 21, 1986, abandoned.

[51] Int. Cl.⁴ .................... G11B 17/02; G11B 21/08; G11B 21/12
[52] U.S. Cl. .................. 360/98.07; 360/99.08; 360/105; 360/106
[58] Field of Search ............... 360/98.01, 98.07, 99.08, 360/103–106, 75

[56] References Cited

U.S. PATENT DOCUMENTS

| | | | |
|---|---|---|---|
| 3,629,679 | 12/1971 | Halfhill | 318/563 |
| 3,772,666 | 11/1973 | Scholz et al. | 360/105 |
| 3,864,740 | 2/1975 | Sordello et al. | 360/77 |
| 4,164,769 | 8/1979 | Kaseta et al. | 360/106 |
| 4,237,501 | 12/1980 | Barmache et al. | 360/75 |
| 4,249,221 | 2/1981 | Cox et al. | 360/97 |
| 4,261,024 | 4/1981 | Desserre | 360/103 |
| 4,286,298 | 8/1981 | Rinkleib | 360/106 |
| 4,366,722 | 1/1983 | Hasler | 360/106 |
| 4,367,503 | 1/1983 | Treseder | 360/98 |
| 4,371,903 | 2/1983 | Lewis | 360/75 |
| 4,423,447 | 12/1983 | Nishida et al. | 360/106 |
| 4,490,635 | 12/1984 | Harrison et al. | 360/106 |
| 4,519,010 | 5/1985 | Elsaesser et al. | 360/97 |
| 4,598,328 | 7/1986 | Frangesh | 360/106 |
| 4,626,942 | 12/1986 | Shoji et al. | 360/97 |
| 4,639,802 | 1/1987 | Neubauer et al. | 360/98 |

Primary Examiner—Robert S. Tupper
Attorney, Agent, or Firm—Fishman, Dionne & Cantor

[57] ABSTRACT

A magnetic disc memory unit is presented wherein a pair of read/write heads are on a pivot arm which is belt driven by a stepper motor. The read/write heads move in an arc, and they retract to a landing position fully off the disc when the unit is shut down. The unit incorporates several features to overcome or minimize vibration and temperature problems so that the unit is suitable for operation in extreme vibration and temperature environments and in all attitudes. These features include, but are not limited to, a rotary table and a rotary mounted spindle made from different materials and joined by a cryogenic joint; pre-loaded elastomeric "O" rings; an electrically conductive ball used for grounding the disc support to the housing; and a single continuous split belt connected between the output of the stepper motor and the pivot arm.

41 Claims, 13 Drawing Sheets

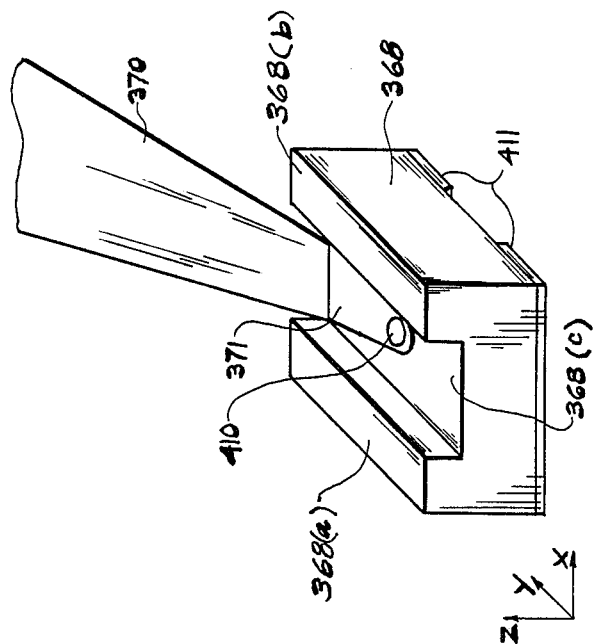
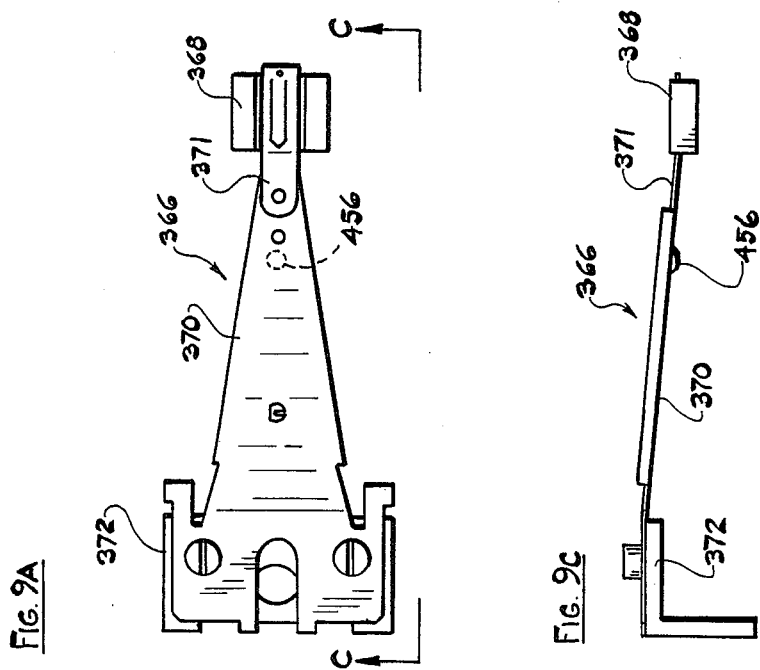
Fig. 9A
Fig. 9B
Fig. 9C

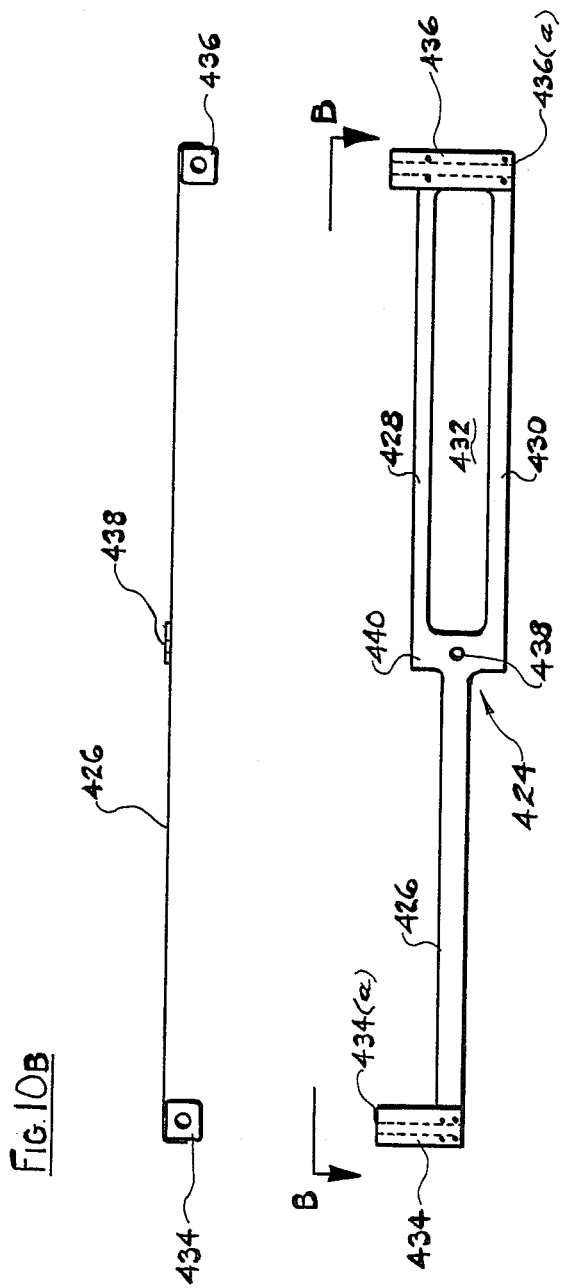

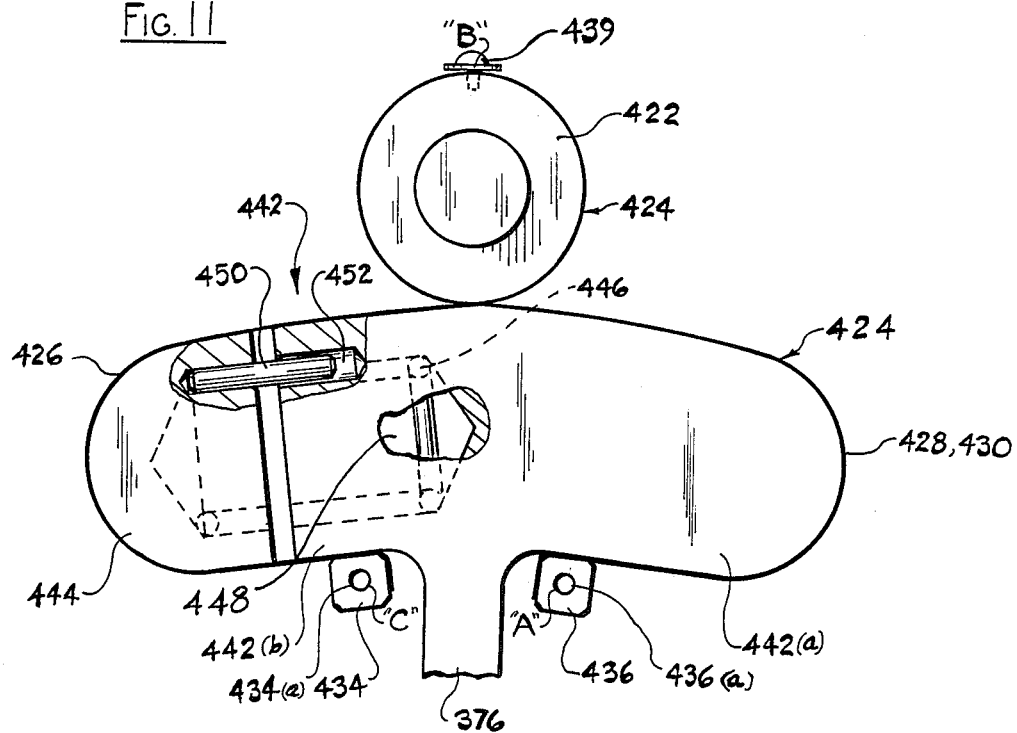

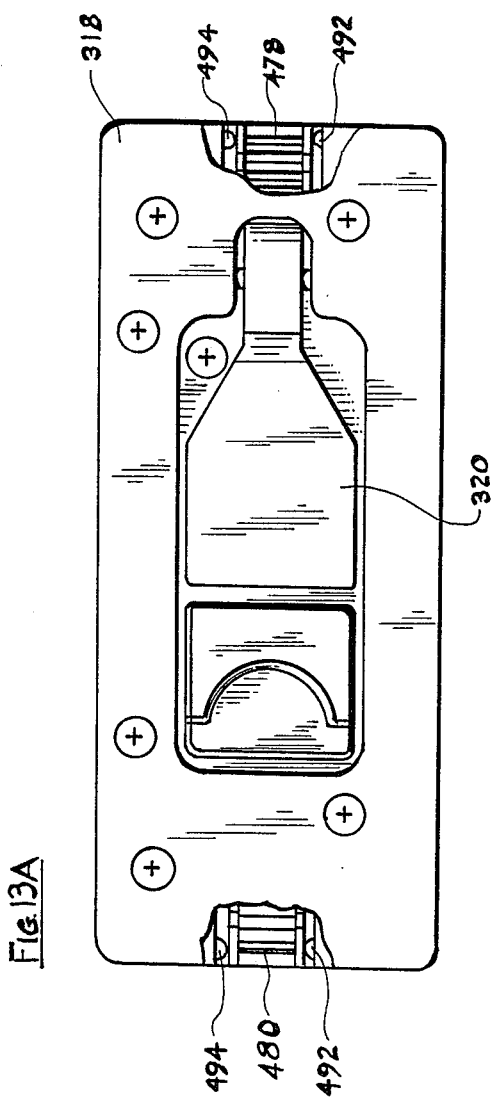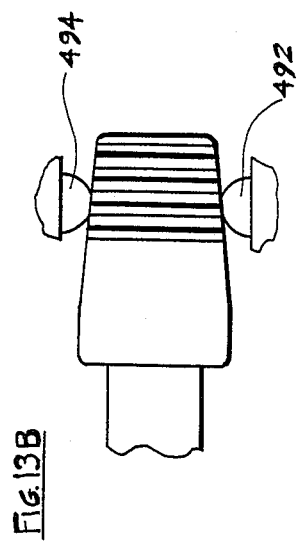

MAGNETIC DISC MEMORY UNIT

RELATION TO OTHER APPLICATIONS

This is a continuation of co-pending application Ser. No. 941,820 filed on Dec, 5, 1986 which is a continuation in part of U.S. Application Ser. No. 821,101, filed Jan. 21, 1986 now abandoned.

BACKGROUND OF THE INVENTION

This invention relates to the field of magnetic disc memory units. More particularly this invention relates to a ruggedized magnetic disc memory unit suitable for use in hostile or severe environments and capable of withstanding loads or stresses, such as shock, vibration, and temperature extremes and which is capable of operation at any attitude. The unit of the present invention is particularly suitable for use in military applications, but it may also find use in other demanding environments, such as, for example, oil and gas well drilling and seismic exploration.

Both magnetic tape recorder units and magnetic disc memory units have been known in the art for many years. Tape units suitable for use in demanding applications are available, but a need exists for an improved disc unit. The disc unit of Application Ser. No. 821,101 discloses a disc unit improved over those theretofore available. The invention of the present application presents a further improved disc unit, particularly in regard to fitting within a smaller envelope and having enhanced capability to operate in extreme vibration and temperature environments.

BRIEF DESCRIPTION OF THE DRAWINGS

Referring now to the drawings, wherein like elements are numbered alike in the several figures:

FIG. 3 is a sectional elevation view taken along line A—A of FIG. 2.

FIG. 4 is a partial sectional elevation view taken along line 4—4 of FIG. 2.

FIG. 9A is a view showing the read/write head carrier used with the present invention.

FIG. 9B is a view showing an enlarged detail of FIG. 9A.

FIG. 9C is a view along line C—C of FIG. 9A.

FIG. 10A is a view showing a split drive belt of the present invention.

FIG. 10B is a view along line B—B of FIG. 10A.

FIG. 11 is an enlarged detail of the attachment and operation of the split belt of FIG. 10A.

FIG. 13A is a view of the front cover and locking handle used with the present invention.

FIG. 13B is an enlarged detail of a cradle/handle feature.

DESCRIPTION OF THE PREFERRED EMBODIMENT

Figure 1:
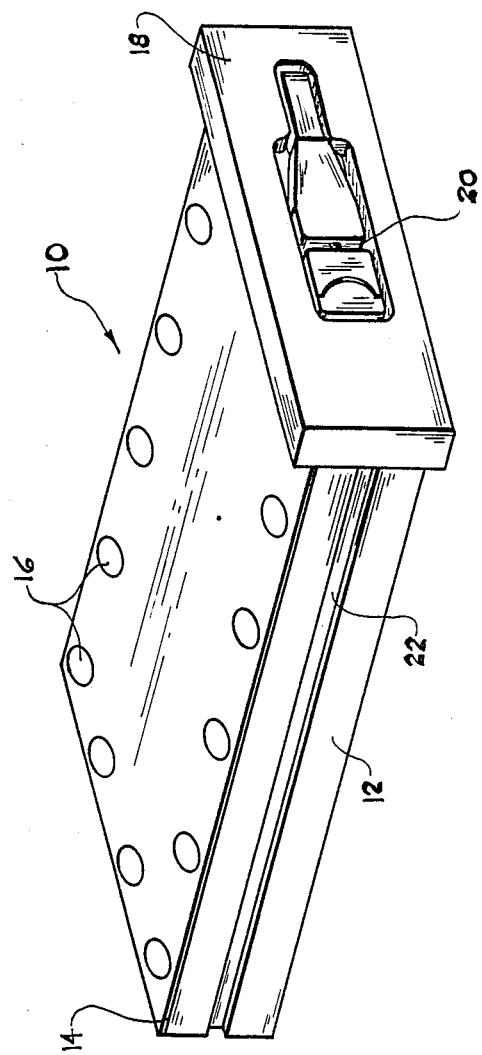
FIG. 1 is a perspective view of the exterior casing or housing of the magnetic disc unit of the present invention.

Referring now to FIG. 1, the exterior housing for the unit of the present invention is shown. Housing 10 has a main housing section 12 with a removable cover plate 14 which is fastened to main housing section 12 with a plurality of screw fasteners 16. Housing section 12 and cover plate 14 are of metal, preferably aluminum. A front cover 18 is attached to housing section 12, and cover 18 has a release latch mechanism 20 for locking the housing into or releasing it from a vibration cradle (not shown) equipped with shock mounts in which the unit would be mounted. Housing section 12 has a mounting slot 22 along the length of its two opposite sides, and these grooves mate with corresponding runners or guides in the cradle. To insure that the unit is properly mounted in the cradle (and to insure proper alignment with electrical connectors on the back end of the unit), the grooves are offset on the two sides of the unit (as are the mating guides in the cradle). Since the grooves and mating guides are asymmetric, the unit can only be mounted in one position (i.e., the proper one) in the cradle.

Figure 2:
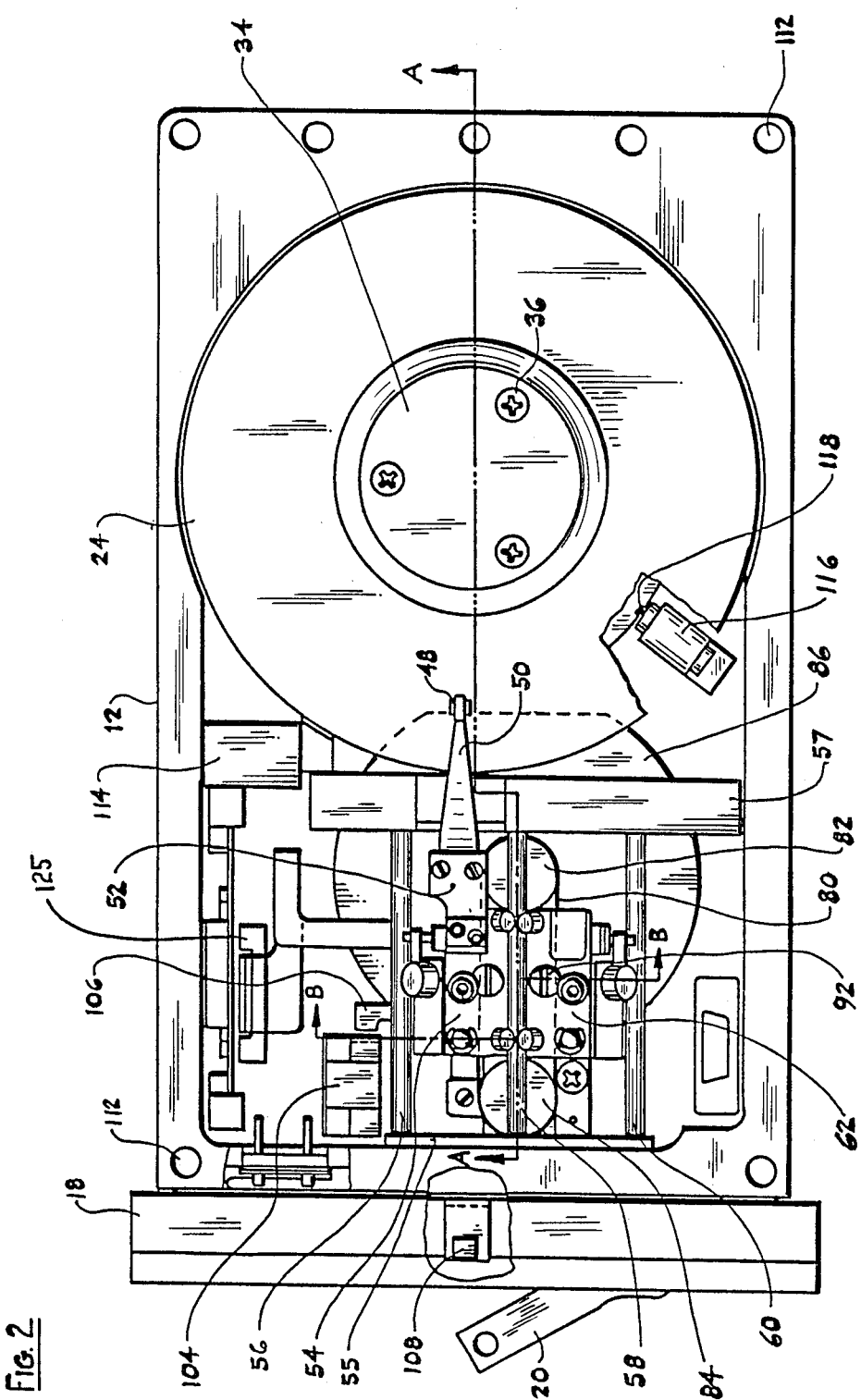
FIG. 2 is a top plan view of the unit of the present invention, FIG. 2 being a top plan view of the unit of FIG. with the top cover removed.
Figures 3, 4:
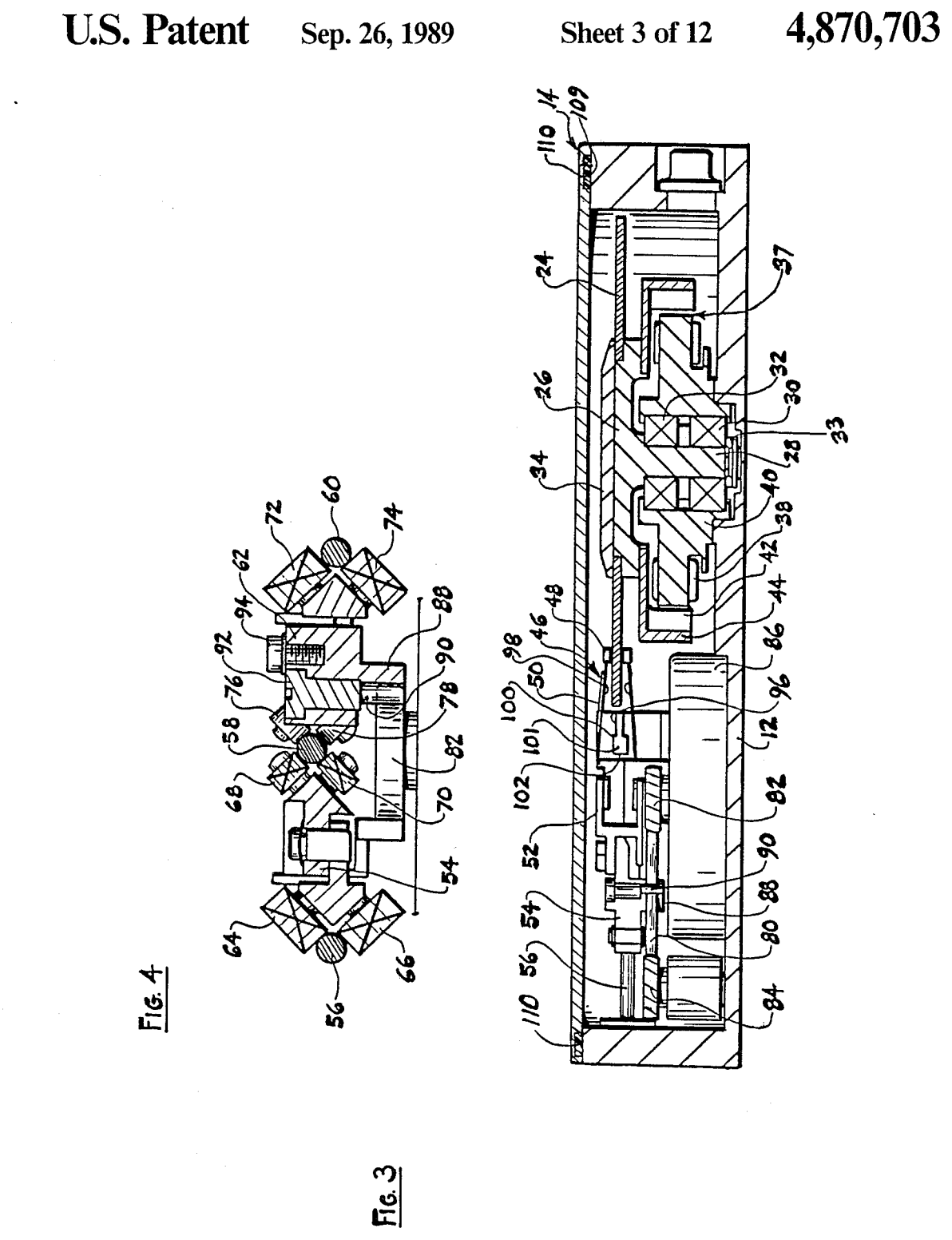

Referring now to a combined consideration of FIGS. 2, 3 and 4, the details of the magnetic disc unit of the present invention are seen. A magnetic disc 24 (which is, per se, known in the art) is mounted on a rotary plate or table 26 from which extends a rotary spindle 28. Spindle 28 is mounted and supported in bearings 30 and 32, preferably via an elastomeric member 33. Magnetic disc 24 is locked to rotary table 26 by a top plate 34 which is releasably fastened to table 26 by screws 36. As best seen in FIG. 3, top plate 34 overlaps the inner edge of a central opening in disc 24 to lock the disc to table 26. Table 26 is driven by a motor 37, the stator 38 of which is mounted on housing segment 40 and the rotor 42 of which is mounted on a skirt 44 which, in turn, is fastened to rotary table 26. Upon the delivery of electrical power to motor 37, table 26 and disc 24 rotate in either a clockwise or counterclockwise direction as desired, preferably in the counterclockwise direction.

A read/write head mechanism 46 cooperates with both the upper and lower sides of magnetic disc 24 (both sides of which may contain data). The upper and lower read/write head mechanisms are identical, so only one will be described. Read/write head mechanism 46 ha a magnetic pickup head 48 which is mounted on the end of a contoured flexure beam 50. Flexure beam 50 is attached to a support plate 52 which, in turn, is attached to a head carriage 54. Flexure beam 50 holds head 48 steady in its position just above but out of contact with disc 24 when the unit is operating; and flexure beam 50 will flex to permit head 48 to be raised or lowered as it moves to and from a home position and an operating position, as will be more fully described hereinafter.

Head carriage 54 is mounted for linear movement on a pair of cylindrical guide rods 56 and 58. The unit also has a third cylindrical guide rod 60; and a counterbalance assembly 62 is mounted for linear movement on guide rods 58 and 60. Guide rods 56, 58 and 60 each extend between and are supported in end plate 55 mounted on the front end of housing section 12 and support block 57 which is mounted on the floor of housing section 12.

As best shown in FIG. 4, head carriage 54 is mounted for linear movement on rod 56 by upper and lower roller bearings 64 and 66 which are rotatably mounted in carriage 54 and engage rod 56 from above and below. Head carriage 54 is also mounted for linear movement on rod 58 by a pair of roller bearings 68, 70 which are rotatably mounted in carriage 54 and engage rod 58 from above and below preferably via an elastomeric member (not shown). Similarly, counterbalance assembly 62 is mounted for linear movement on rod 60 by upper and lower roller bearings 72, 74 which are rotatably mounted in counterbalance assembly 62 preferably via an elastomeric member (not shown); and assembly 62 is also mounted for linear movement on rod 58 by a pair of rollers 76, 78 which are rotatably mounted in assembly 62 and engage rod 58 from above and below also preferably via an elastomeric member (not shown).

As can be seen and understood from the foregoing, head carriage 54 and counterbalance assembly are movable back and forth in linear directions which are radial or parallel to a radial line with respect to disc 24. Also, counterbalance assembly 62 is constructed so that its weight equals the weight of head carriage 54, support plate 52 and flexure beam 50. This balancing of weights provides for static and dynamic balance in the assembly to minimize the effects of shock and vibration.

Head carriage 54 and counterbalance assembly 62 are each attached to a continuous drive belt 80, preferably of stainless steel material. Drive belt 80 extends between and around drive capstan 82 and a rotatable idler 84. A stepping motor 86 drives capstan 82 and moves belt 80 in step increments in response to operating inputs to the stepping motor. Head carriage 54 is attached to one leg of belt 80 and counterbalance assembly 62 is attached to the other leg of belt 80. Thus, head carriage 54 and counterbalance assembly 62 move equal amounts and in opposite directions when the stepping motor is actuated. This equal and opposite action of head carriage 54 and counterbalance assembly 62 contribute to the stability of operation and the shock and vibration resistance of the unit of the present invention.

The head carriage 54 and counterbalance assembly 62 are each attached to drive belt 80 by an identical gripping mechanism, one of which (associated with counterbalance 62) will be described. Belt 80 is gripped between a depending portion 88 of counterbalance 62 and an eccentrically mounted shaft or clamp finger 90 which is eccentrically mounted on a rotatable screw element 92. Belt 80 passes between clamp finger 90 and depending portion 88, and the belt is gripped and locked between clamp finger 90 and portion 88 when the eccentric is in the actuated or locked position. Conversely, the counterbalance 62 may be released from the belt 80 by rotating screw 92 to rotate eccentric 90 away from depending portion 88. A lock screw 94 overlaps and contacts the head of screw 92 to lock screw 92 and eccentric 90 in the position to engage belt 80.

As can be seen and understood from the foregoing, actuating signals to stepper motor 86 will drive belt 80 and head carriage 54 to accurately position read/write head 48 at a desired position relative to disc 24. When head 48 is in an operative position over disc 24 for reading or writing, the head is close to but spaced from the disc; and, it is important to keep the head spaced from the disc to avoid contact with and damage to the disc. When the disc is spinning, an air cushion or air bearing effect is established between disc 24 and head 48 whereby head 48 operates like a flying head. However, in accordance with the present invention, when the disc 24 is not rotating (or if retraction of the head is programmed) the head 48 is retracted to a "home" or "reference" position where it is stored on a landing pad 96 to both store and protect the head. When rotation of the disc stops for any reason, stepper motor 86 operates to drive belt 80 in the direction to move head carriage 54 away from disc 24. As the head assembly is retracted, a cam follower 98 (cam follower 98 having a preferably spherical or semispherical shape) on the underside of flexure beam 50 contacts the leading step edge 100 of a step element 101 whereby head 48 is lifted away from disc 48 (i.e., moved in a direction perpendicular to disc 48). It will be appreciated that a cam follower 98 with a spherical or semi-spherical shape will have the necessary abrupt angle change which will permit the head 48 to be quickly raised and lowered over a relatively short linear distance. With further retraction, motion of the read/write mechanism and head 48 moves parallel to disc 24 (with head 48 spaced from the disc) and then cam follower 98 drops behind the trailing edge 102 and head 48 moves perpendicularly downward to a rest position on landing pad 96. Similarly, when signals are delivered to stepper motor 86 to move the read/write mechanism to the operating position to position head 48 over disc 24, cam follower 98 will contact trailing edge 102 to lift head 48 perpendicularly upward off landing pad 96; and the read/write mechanism and head 48 then move parallel to disc 48 with head 48 spaced considerably above disc 24; and then head 48 moves perpendicularly downward to its operating position just away from the surface of disc 24 when cam follower 98 drops along leading edge 100 of cam member 101. This portion of head 48 perpendicular to the surface of disc 24 when the head is moved to the retracted or operative positions is a very important feature of the present invention in that it ensures against dragging of the head across the surface of the disc, whereby both the heads and the disc are protected.

The magnetic disc unit has an electro-optic sensor 104 which functions to deactivate the stepper motor when the head carriage 54 and head 48 reach the full retracted position. A flag 106 is attached to head carriage 54. When head carriage 54 approaches the full retracted position, flag 106 enters a slit in sensor 104; and, when carriage 54 and head 48 reach the full retracted position, flag 106 interrupts the optical path in sensor 104 whereby sensor 104 generates an output signal to terminate operation of stepper motor 86 in the retracted direction.

The unit includes a zero index magnetic sensor 116 which interacts with skirt 44 to sense an index notch 118 or other indicator on skirt 44 to determine a "0" index position to coordinate the angular position of the disc with axial movement of head 48. Skirt 44 is comprised of a magnetic material such as iron. Index notch 118 is actually an air gap in the magnetic iron skirt 44. Sensor 116 thus senses the change in a magnetic path (reluctance) at index notch 118. In this way, the angular position of data stored (and readout thereof) and the axial position of head 48 can be coordinated from a reference point for retrieval of desired information.

The unit also includes a feature whereby a power interruption for any reason will result in drawing the head carriage 54 and head 48 to the fully retracted position. The power interruption could be caused by intentional shut down, a power failure, or by actuating front cover latch 20 to the open position which would permit removal of the unit from its cradle. The opening of latch 20 is sensed by a magnetically operated switch 108 which operates to shut down power to the unit. Regardless of the cause of power interruption, the voltage to spindle motor 37 drops to zero. That drop in voltage is sensed in the electronic control unit (FIG. 5); and the spindle motor, which is still spinning, is used as a generator to power both the stepper motor and the stepper motor microprocessor to drive head carriage 54 and head 48 to the full retracted position.

Cover 14 includes a channel 109 along the perimeter thereof as shown in FIG. 3. Channel 109 includes a seal 110 therein, preferably an elastomeric seal. Seal 110 is compressed between cover plate 14 and housing 12 when housing 12 is secured in place so as to hermetically seal the interior space of the unit. (It will be understood that cover plate 14 and housing 12 have matching holes 112 to receive screws 16, only some of these holes being shown in FIG. 2. Holes 112 are preferably positioned to the outside of seal 110.) The interior of the hermetically sealed unit is filled with an inert gas such as freon to establish and maintain a constant environment for the system. The rotary movement of disc 24 establishes a current or circulating flow of the freon gas in the sealed unit, and the gas flows through an internal filter 114 to constantly filter out any contaminants that may appear in the gas (such as from the disc or any other component in the system). The combination of hermetic sealing and an internal filter establishes a particularly stable and contaminant free environment.

For convenience of assembly, disassembly and repair, the unit is modularized. The rotary table 26, spindle 28, top 34 and motor 37 constitute one module; the entire read/write mechanism (head 48, beam 50, plate 52), head carriage 54, counterbalance assembly 62, guides 56, 58, 60, stepper motor 86, and end plate 55 and support block 57 constitute another module; housing 12, cover 14 and seal 110 constitute another module; and front cover 18 with latch 20 and switch 108 constitutes another module.

Figure 5:
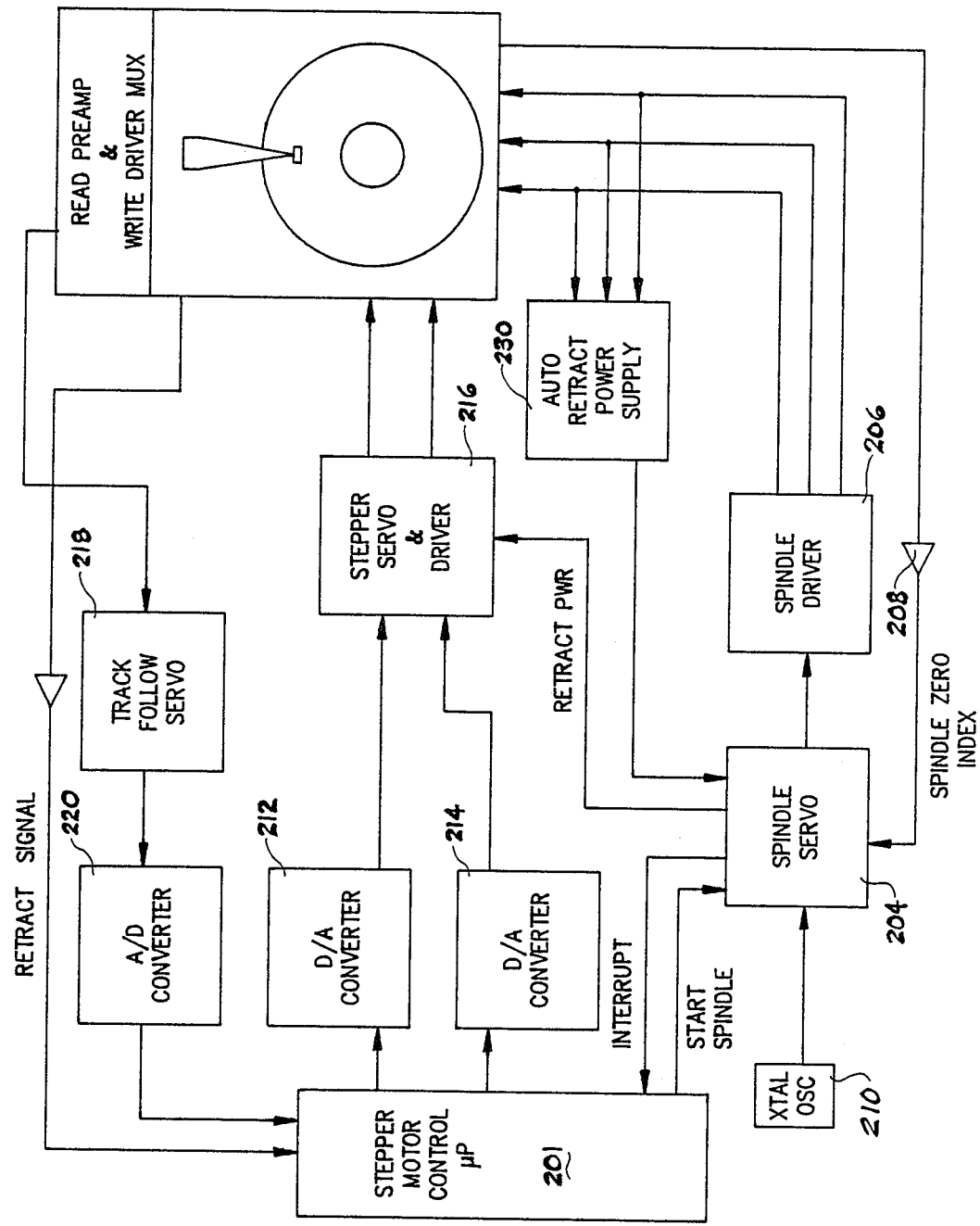
FIG. 5 is a block diagram of an electrical control system suitable for operating the unit of the present invention.

FIG. 5 shows a block diagram of an electronic control system suitable for use with the unit of the present invention. As shown in FIG. 5, when the spindle servo 204 generates a drive signal to spindle driver 206 power is supplied to spindle motor 37 causing motor 37 to rotate. The speed of spindle motor 37 is synchronized to the spindle servo 204 via the spindle zero index 208 signal and the crystal oscillator 210 frequency. The spindle zero index signal is generated by the zero index magnetic sensor 116. Thus, at this point, the spindle motor is rotating at a desired speed and the read/write head 48 is at a pre-selected location over the disc.

The electronics which controls the operation of the read/write mechanism is as follows: Upon receipt of a preselected command, a signal proportional to the distance to be traveled (by the read/write head 48) is generated by microprocessor 201 and converted to an analog format by the D/A converters 212 and 214 whereby the signals are transmitted to the stepper motor 86 via the stepper servo and driver 216. As a result, the read/write head 48 will have been moved to the commanded position over a pre-selected track or cylinder of the disc 24. Once the commanded position is acquired, a unique servo pattern which is embedded in the track or cylinder of disc 24 is detected by the track follow servo 218, reformatted by the A/D converter 220 and processed by microprocessor 201 to maintain (or align) the head position in the center of that disc track. This precludes any undesirable off-track drift by read/write head 48 and resultant problems during subsequent read/write functions.

During the event of a power interruption of any kind (as discussed earlier), the read/write head 48 and carriage 54 are returned to the fully retracted position on landing pad 96. This automatic retraction is initiated when microprocessor 201 detects any of the aforementioned power interruption states (such as when magnetic switch 108 is actuated by latch 20). When a power interruption is detected, microprocessor 201 will transmit motion signals via D/A converters 212, 214 and stepper servo and driver 216 to the stepper motor 86 causing the read/write head 48 to automatically withdraw to the landing pad. Power to control the automatic retraction of head 48 is derived from the spindle motor 37, acting as a generator (as discussed in detail above). Thus, a signal is sent from the auto retract power supply 230 to the microprocessor 201, D/A converter 212, 214 and stepper servo and driver 216 via the spindle servo 204. The auto retraction function is initiated upon receipt of the retract signal (such as from switch 108 which is actuated by latch 20) by the microprocessor 201.

The improved embodiment of this continuation-in-part application is shown in FIGS. 6–13. The improved unit is contained in a housing which is generally as shown and described with respect to FIG. 1.

Referring now to a combined consideration of FIGS. 6, 7A, 7B and 8, a number of details of the improved magnetic disc unit of the present invention are seen. A pair of magnetic discs 324 (which are, per se, known in the art) are mounted on a rotary plate or table 326 which is attached to a rotary drive spindle 328. Spindle 328 is mounted and supported in bearings 330 and 332. Spindle 328 is a separate member from the table 326, consisting of a steel plate portion 328(a) and a steel shaft portion 328(b). Table 326 is fastened to drive spindle 328 by three screws 329 which are countersunk in table 326 and extend into plate portion 328(b). Magnetic discs 324 are locked to and positioned on rotary table 326 by a top plate 334 which is releasably fastened to table 326 by screws 336 and a ring spacer 335 between the two discs. As best seen in FIG. 7A, top plate 334 overlaps the inner edge of a central opening in upper disc 324 to lock the discs to table 326. Table 326 is driven by a motor 337, the stator 338 of which is mounted on housing member 340 and the rotor 342 of which is mounted on a skirt 344 which, in turn, is fastened to rotary table 326. Upon the delivery of electrical power to motor 337, table 326 and discs 324 rotate in either a clockwise or counterclockwise direction as desired, preferably in the clockwise direction for the rotary arm system of this embodiment. The clockwise rotation of the discs for the rotary arm system optimizes the stability of the head over small skew angles as the head flies over the disc.

Housing member 340 consists of an upper segment 340(a) and a lower segment 340(b) which are fastened together by screws 341(a) and 341(b). There are a plurality of each of screws 341(a) and 341(b); and screws 341(a) and 341(b) extend into a thickened portion of the base of main body 312 to physically lock member 340 to main body 312. Bearings 330 and 332 are trapped and supported between annular flanges 343(a) and 343(b) on segments 340(a) and 340(b), respectively.

The rotary table, drive spindle and related structure of FIG. 6A includes important features of the present invention for improved vibration and temperature characteristics. Magnetic discs 324 are aluminum; and drive tables such as table 326 are typically made of steel. However, and somewhat surprisingly, a temperature induced differential expansion problem has been found to exist if the aluminum discs 324 are mounted on a steel drive table. The occurrence of this problem was unexpected and surprising, because it had been expected that thermal expansion would be isotropic (i.e., uniform) with respect to the axis of spindle 328. However, that was found not to be the case. Rather, it was found that thermal expansion starts at the location of each clamping site where the discs 324 are clamped to table 326. As a result, unisotropic (i.e., nonuniform) thermal expansion occurs; and the problem is exacerbated by the presence of a steel drive table in the center of discs 324 since the coefficients of thermal expansion of steel and aluminum are significantly different (on the order of ½). This differential expansion results in distortion of the center opening in the discs 324, both of which can seriously impair the operation and reliability of the unit.

In accordance with the present invention, this differential expansion problem is solved by use of an aluminum drive table 326, an aluminum top plate 334, an aluminum spacer ring 335 and screws 336; and aluminum drive table 326 is locked to the steel plate portion 328(a) of the drive spindle by a cryogenic joint and by screws 329. Plate 328(a) and a mating recess in drive table 326 are sized for a press fit. The cryogenic joint between aluminum table 326 and plate portion 328(a) is formed by cooling steel plate 328(a) with liquid nitrogen, heating aluminum table 326, then mating the parts together and permitting them to reach room temperature. The parts are then securely locked together. This cryogenic joint serves to enhance alignment between the parts and ensure that the discs 324 are coaxial with and perpendicular with respect to the axis of drive shaft 328(a).

The improved vibration characteristics for the drive spindle and rotary table are achieved by imposing a preload on the bearing structure (330,332). The bearing 330,332 are spaced and urged apart against flanges 343(a) and 343(b) by a central ring spacer 346 and a pair of oppositely disposed Belville springs 348, 350 which load the bearings away from each other and against their support flanges. A broad temperature range (BTR) "0" ring 352 is positioned between a load plate 354 and lower bearing 330, and load plate 354 is secured to (but spaced from) spindle shaft 328(a) by a screw 356. Screw 356 and load plate 354 are adjusted to apply a preload of twenty (20) pounds to "0" ring 352, which preload is, in turn, imposed on the bearing pack (330,332). This preload, working in conjunction with the Belleville springs operates to maintain contact throughout the bearing pack to reduce the effects of shock load and vibration.

Referring to FIG. 7B, an important detail of the present invention is shown. Screw 356 has a bore 358 in which a spring 360 and ball 362 are located (all of which are steel or other electrically conductive material). Spring 360 loads ball 362 against metal hosing 312, thus grounding spindle 328 and table 326 to housing 312 to avoid a buildup of static charge or voltage differential.

Figure 6:
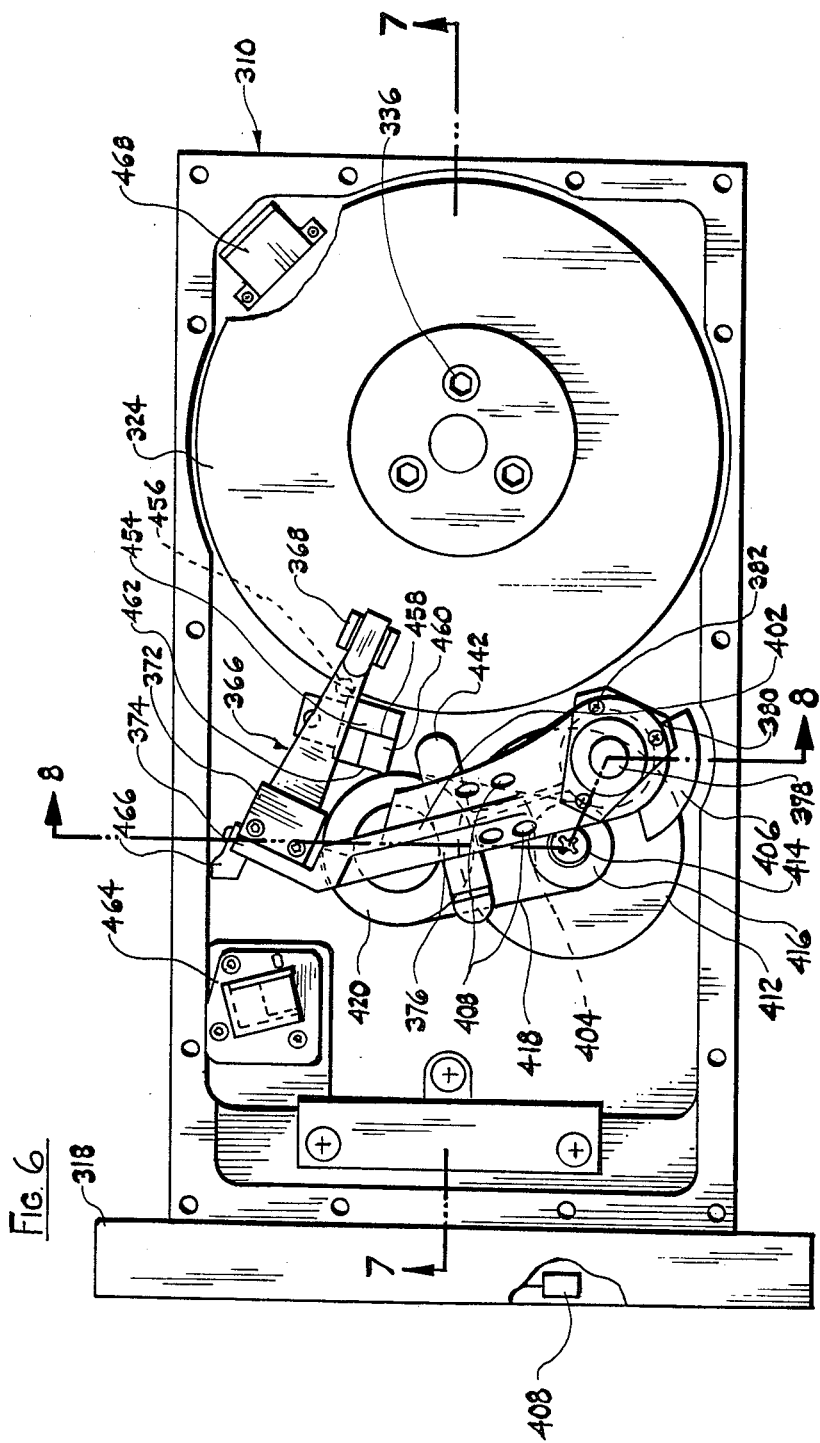
FIG. 6 is a top plan view, similar to FIG. 2, showing the improved second embodiment presented in this continuation-in-part application.
Figure 7:
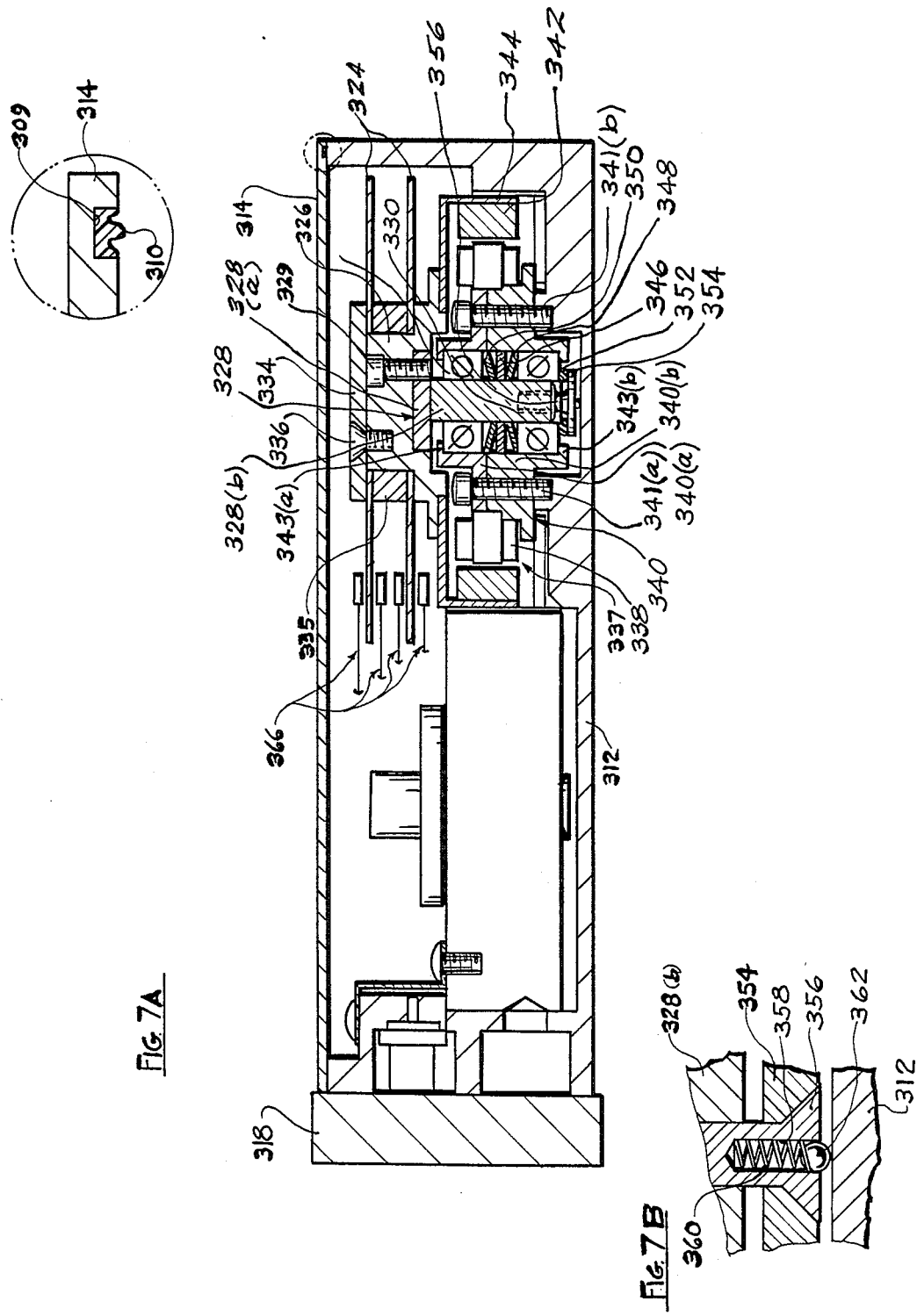
FIG. 7A is a partial view along line 7—7 of FIG. 6.
FIG. 7B is an enlarged showing of a detail of FIG. 7A.

Read/write head mechanisms 366 cooperate with both the upper and lower sides of each of the magnetic discs 324 (both sides of which may contain data). The read/write head mechanisms are identical, so only one will be described. The read/write mechanism is generally shown in FIGS. 6 and 7A and is shown in detail in FIGS. 9A and 9B. Read/write head mechanism 366 has a magnetic pickup head 368 which is mounted on the end of a contoured beam 370 and a flexure member 371 attached to the end of beam 370. Beam 370 is attached to a support plate 372 which, in turn, is attached to the mounting platform 374 of a rotary arm 376. Beam 370 and flexure member 371 hold head 368 steady in its position just above but out of contact with disc 324 when the unit is operating; and beam 370 will flex to permit head 368 to be raised or lowered as it moves to and from a home position and an operating position, as will be more fully described hereinafter.

In the embodiment of FIGS. 1-5, the read/write mechanism was mounted on a carriage and guide rods for linear movement. While that structure is suitable for its intended purposes, it does present some problems which are overcome by the embodiment presently being described. One of the problems is that the linear actuator system requires precise alignment among the several parallel guide rods, and it requires an intricate arrangement of multiple aligned bearings. Also, the length of the unit has to be long enough to accommodate all of the linear movement, thus resulting in a unit that is too long for some applications. The rotary arm system of the embodiment presently being described overcomes these problems.

Figure 8:
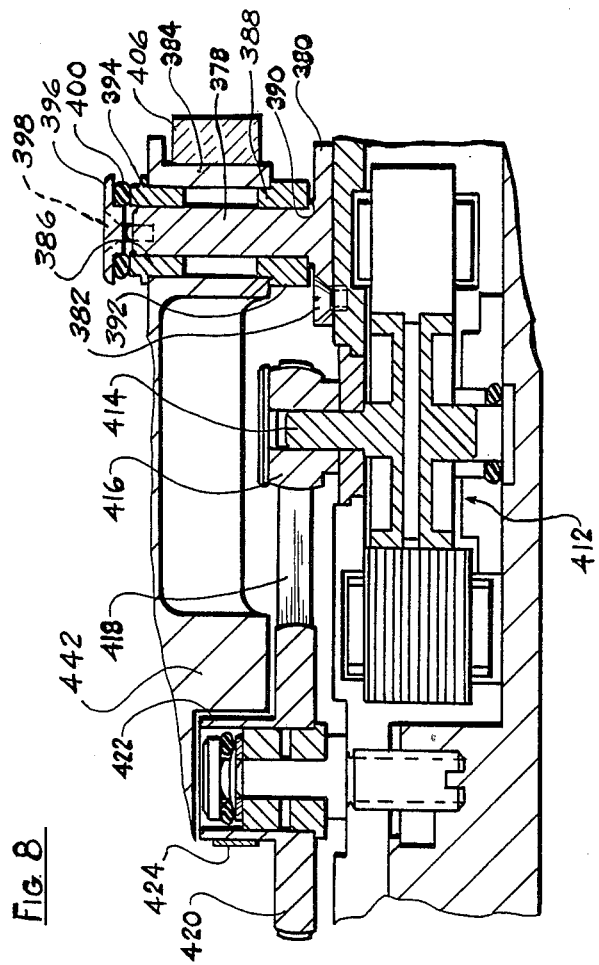
FIG. 8 is a partial sectional elevation view taken along line 8—8 of FIG. 6.

Referring particularly to FIGS. 6 and 8 rotary arm 376 is mounted for rotation on a shaft 378 which is integral with a triangular shaped footpad 380. Footpad 380 is fastened to the base of main body 312 by three screws 382. Rotary arm 376 is mounted on shaft 378 by a depending integral sleeve 384 which is trapped and held between upper bearing member 386 and lower bearing member 388. Lower bearing 388 rests on an annular step 390 on footpad 380, and an annular flange 392 engages the lower part of sleeve 384. An annular flange 394 on upper bearing 386 engages the top of sleeve 384. A retaining cap 396 is connected to shaft 378 by a screw 398, and a preload "0" ring 400 is trapped between cap 398 and upper bearing member 386. Cap 396 and screw 398 impose a preload on "0" ring 400 to impose a preload on the elements of bearings 386, 388 and sleeve 384 to stabilize them and arm 376 against shock loads and vibration.

It is important to the function of the present invention that arm 376 be statically and dynamically balanced and have a resonant frequency above 600 Hz. Strengthening arms or ribs 402 and 404 run along the upper and lower surfaces, respectively, of arm 376 so that the arm is strengthened and meets the desired resonant frequency requirements. For static balance, a counterweight 406 is attached to sleeve 384; for dynamic balance, arm 376 may have a plurality of a balance holes 408 (e.g., threaded holes) by which weights may be affixed to achieve dynamic balance.

Read/write head 368 is also dynamically balanced about its X, Y and Z axes (see FIG. 9B). This is accomplished by forming head 368 with weight bars 368(a), 368(b) which define a mounting channel 368(C) therebetween; and head 368 is configured so that its center of gravity in at least the X and Y axes (and preferably in the Z axis as well) is at the surface in channel 368(c) at the point of attachment 410 of flexure member 371 to head 368. If the center of gravity in the Z axis can not be located at said attachment joint, the center of gravity in the Z axis is located as close as practicable to said attachment point Head member 368 has two rails 411 to form air bearing surfaces in a known manner.

The balancing of arm 376 and head 368 are important features to protect the surfaces of discs 324 from damage during operation of the unit. During normal operation, head 368 is positioned over spinning disc 324 and is held slightly spaced from the disc (about 10-14 microinches) by an air bearing effect. Any contact between head 368 and disc 324 during operation will damage the disc or the head, or both; and such contact is to be avoided. The balancing of head 368 and arm 376 prevent (or at least minimize) any such contact and damage. Mounting head 368 at its center of gravity in all three axes eliminates or reduces roll of the head about the "Y" axis (i.e., the axis along beam 370). Roll motion would reduce the air bearing stability. Elimination of roll reduces the risk of the head contacting the disc during movement of the head from one position to another relative to the disc. Roll motion also poses a risk of head contact with the disc caused by vibration; and elimination of roll also reduces that risk.

Rotary arm 376 is driven by a stepper motor and a pulley and drive belt system. However, the drive of arm 376 is not effected simply by a drive input to rotary shaft 378. Rather, to improve the accuracy of the stepper motor drive system and reduce vibration, arm 376 is directly attached to and driven by the belt system at a location near the end of the arm removed from shaft 378.

The stepper motor and pulley and belt drive system are best understood by referring to FIGS. 6, 8, and 11. A stepper motor 412 (a commercially available unit) has an output shaft 414 on which a capstan or pulley 416 is mounted. Pulley 416 drives a compliant (preferably polyimide such as Kapton available from duPont) continuous belt 418 which engages and drives a second and larger diameter rotatable pulley 420. There is a 2/1 ratio between the diameters of pulleys 420 and 416. Pulley 420 has a smaller diameter pulley segment 422 to which a second, and specially configured, drive belt 424 is affixed.

Drive belt 424 is shown in FIGS. 10A and 10B. Drive belt 424 is a split belt of a metallic material (preferably stainless steel). Belt 424 has a first single strand section 426 and a double strand section of strands 428, 430 bordering and defining an intermediate space 432. In operation, single strand section 426 moves in space 432 between strands 428, 430. Belt 424 is tack welded to a pair of mounting studs 434, 436, each of which had a threaded center bore 434(a), 436(a), respectively. Belt 424 also has a reinforced attachment opening 438 in the web 440 joining strands 428, 430 to strand 426.

Belt 424 is attached to and drives arm 376, the attachment to arm 376 and drive being effected at the studs 434, 436 and site 438 and by a wing member 442 on the underside of arm 376. Referring jointly to FIGS. 10A and 11, stud 436 is attached to arm 376 at point "A", and the double stranded portion of the belt (i.e., strands 428, 430), is wrapped around the right hand portion 442(a) of wing member 442 and around smaller diameter pulley segment 422. Belt web 440 is attached by a screw fastener 439 through opening 438 to pulley segment 422 at attachment site ""B". The single stranded portion 426 of the belt then continues around pulley segment 422, wraps around the left hand portion 442(b) of wing segment 442, and stud 434 is attached to arm 376 at point "C". Studs 434 and 436 are positioned on the underside of arm 376 and are secured to arm 376 by screw fasteners which extend through holes in arm 376 at points "A" and "C" and engage the threaded bores 434(a) and 436(a) in studs 434 and 436. From the foregoing, it can be seen that steel belt 424 wraps around and engages wing 442 and pulley 422, with the double stranded part of the belt extending from attachment site "A" to attachment site "B", and with the single stranded portion of the belt extending from attachment site "B" to attachment site "C" and passing through opening 432 in the double stranded portion of the belt.

Wing 442 includes a tensioning mechanism to keep a tension load on belt 424 to keep the belt taut and in contact with the surfaces of wing 442 and pulley 422. The tension load is imparted by an end segment 444 of wing portion 442(b) which is split (i.e., separated from wing 442(b)) and which is forced outwardly against belt strand 426 by a spring 446 housed in a bore 448 in wing segment 442(a). A pair of guide dowel pins 450 (only one of which is seen in FIG. 11) are press fit into tension segment 444 and have a sliding fit in a pair of bores 452 in wing segment 442(a). The dowel pins serve to keep tension segment 444 aligned with the main body of the wing; and spring 446 urges segment 444 outwardly to impose a tension load on belt 424. It is important to note that while split belts have been used previously to convert rotary to linear motion, the split belt is being used in this invention to achieve rotary to rotary motion. Furthermore, in the present invention the belt 424 operates through a direct and 100% positive drive of arm 376 rather than relying on a friction drive. This positive drive enhances the accuracy of positioning arm 376.

Stepper motor 412 responds to actuating signals delivered to it to move arm 376 in microsteps. When the stepper motor is actuated, pulley 416 is stepped in arcs of rotary movement to move belt 418 and pulley 420 and 422 in corresponding steps of linear and arcs of rotary movement, respectively. Because of the 2/1 ratio of diameters of pulleys 420 and 416, the steps of pulleys 420 and 422 are only ½ the steps of pulley 416, so the system has a built in ratio of ½. Movement of pulley 422 drives split belt 424 whereby single strand section 426 is fed through the space 432 in the double strand section to step arm 376 clockwise or counterclockwise about the axis of shaft 378. Actually, since it is desirable to move arm 376 in very small increments (because of the spacing of data bands on discs 324), the output of stepper motor 412, and hence the motion of arm 376 is caused to be in microsteps by the use of known microstepping techniques employing opposing coils in the stepper motor.

As with the first embodiment (FIGS. 1-5), actuating signals to stepper motor 412 will position read/write head 368 at a desired position relative to disc 324. When head 368 is in an operative position over disc 324 for reading or writing, the head is close to but spaced from the disc; and, it is important to keep the head spaced from the disc to avoid contact with and damage to the disc. When the disc is spinning, an air cushion or air bearing effect is established between disc 324 and head 368 whereby head 368 operates like a flying head. However, when the disc 324 is not rotating (or if retraction of the head is programmed) the head 368 is retracted to a "home" or "reference" position where it is stored on a Delran (acetal copolymer) landing pad 454 to both store and protect the head. When rotation of the disc stops for any reason, stepper motor 412 operates to drive belt 418 in the direction to move read/write head 368 away from disc 324. As the head assembly is retracted, a cam follower 456 (cam follower 456 being a spherical or semispherical ball element) on the underside of flexure beam 370 contacts the leading step edge 458 of a step element 460 whereby head 368 is lifted away from disc 324 (i.e., moved in a direction perpendicular to disc 324). It will be appreciated that a cam follower 456 with a spherical or semi-spherical shape will have the necessary abrupt angle change which will permit the head 368 to be quickly raised and lowered over a relatively short linear distance. With further retraction, the read/write mechanism and head 368 moves parallel to disc 324 (with head 368 spaced from the disc) and then cam follower 456 drops behind the trailing edge 462 of step 460 and head 368 moves perpendicularly downward to a rest position on teflon landing pad 454. Similarly, when signals are delivered to stepper motor 412 to move the read/write mechanism to the operating position to position head 368 over disc 324, ball cam follower 456 will contact trailing edge 462 to lift head 368 perpendicularly upward off landing pad 454; and the read/write mechanism and head 368 then move parallel to disc 324 with head 368 spaced considerably above disc 324; and then head 368 moves perpendicularly downward to its operating position just away from the surface of disc 324 when ball cam follower 456 drops along the leading edge 458 of step 460. This moving of head 368 perpendicular to the surface of disc 324 when the head is moved to the retracted or operative positions is a very important feature of the present invention in that it ensures against dragging of the head across the surface of the disc, whereby both the heads and the disc are protected.

It is important to note that the mechanism for raising or lowering head 368 is small and compact. This makes it possible to accomplish the lifting or lowering motion in a short space and cover a short arc travel of arm 376, which is an important space conservation feature in a system where space is at a premium.

The ball cam mechanism also results in an abrupt raising or lowering of heat 368, which reduces the exposure of the disc and head to vibration induced damage when the air bearing effect is lost. When the unit is operating and is shut down for any reason, the air bearing effect is quickly lost, and it is important to get the head away from the disc as quickly as possible to avoid fluttering or tilting of the head. For the same reasons, when the head is being lowered to an operating position, it is also desired to lower it as quickly as possible. The ball shaped cam follower and the step cam accomplish these objectives; and the counterbalanced head configuration (described with respect to FIG. 9B) also minimizes roll or flutter during raising or lowering of the head.

While only one landing pad and cam mechanism has been discussed, it will be understood that each of the four beams 366 has a cam follower 456, and there is a stack of four landing pads and cam mechanism in a linear array for each beam 366.

As with the previously described linear unit, the rotary arm embodiment also has an electro-optic sensor 464 which functions to deactivate the stepper motor when the arm 376 and head 368 reach the full retracted position. A flag 466 is attached to arm 376. When arm 376 approaches the full retracted position, flag 466 enters a slit in sensor 464; and, when arm 376 and head 368 reach the full retracted position, flag 466 interrupts the optical path in sensor 464 whereby sensor 464 generates an output signal to terminate operation of stepper motor 412 in the retracted direction.

As with the previously described linear unit, the rotary arm embodiment also includes a coordination system such as shown and described with respect to FIG. 1 where a zero magnetic sensor 116 interacts with skirt 44 to sense an index notch 118 or other indicator on skirt 44 to determine a "0" position to coordinate the angular position of the disc with axial movement of head 48. Skirt 44 is comprised of a magnetic material such as iron. Index notch 118 is actually an air gap in the magnetic iron skirt 44. Sensor 116 thus senses the change in a magnetic path (reluctance) at index notch 118. In this way, the angular position of data stored (and readout thereof) and the axial position of head 368 can be coordinated from a reference point for retrieval of desired information.

As with the previously described linear unit, the rotary arm unit also includes a feature whereby a power interruption for any reason will result in moving arm 376 and head 368 to the fully retracted position. The power interruption could be caused by a normal shut down command, i.e., an intentional shut down, or by an abnormal situation such as a power failure or by actuating front cover latch 320 to the open position for removal of the unit from its cradle while the disc is spinning. The opening of latch 320 is sensed by a magnetically operated switch 408 in handle 318 of FIG. 6 which operates to shut down power to the unit. Regardless of the cause of power interruption, the voltage to spindle motor 337 drops to zero. That drop in voltage is sensed in the electronic control unit (FIG. 5); and the spindle motor, which is still spinning, is used as a generator to power both the stepper motor and the stepper motor microprocessor to drive arm 376 and head 368 to the full retracted position in the same manner as described with respect to the previous (linear) embodiment.

As with the previously described linear unit, the case or housing rotary arm unit is hermetically sealed by means of a channel 309 with a molded seal 310 therein, preferably an elastomeric seal, in cover plate 314. Seal 310 is compressed between cover plate 314 and housing 312 so as to hermetically seal the interior space of the unit. It will be understood that cover plate 314 and housing 312 have matching holes to receive screws 16. (The holes are preferably positioned to the outside of seal 310.) The interior of the hermetically sealed unit is filled with an inert gas such as freon to establish and maintain a constant environment for the system. The rotary movement of discs 324 establishes a current or circulating flow of the freon gas in the sealed unit, and the gas flows through an internal filter 468 to constantly filter out any contaminants that may appear in the gas (such as from the disc or any other component in the system). The combination of hermetic sealing and an internal filter establishes a particularly stable and contaminant free environment.

For convenience of assembly, disassembly and repair, the unit is modularized. The rotary table 326, spindle 328, top 334 and motor 337 constitute one module; the entire read/write mechanism (head 348, beam 370, plate 372), arm 376, counterbalance 406, stepper motor 418, constitute another module; housing 312, cover 314 and seal 410 constitute another module; and front cover 318 with latch 320 and switch 408 constitute another module.

Figure 12A:
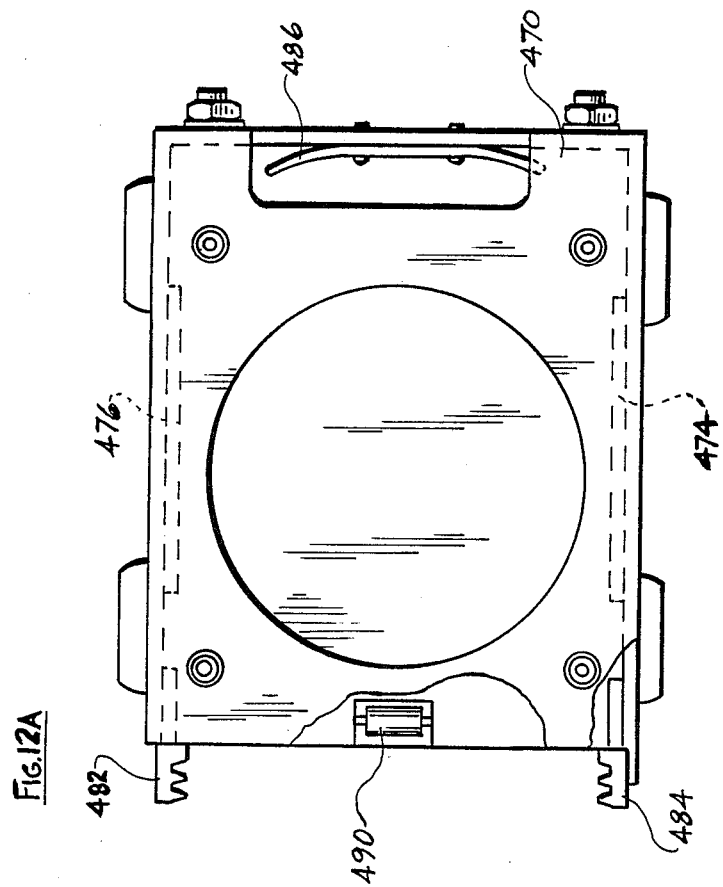
FIG. 12 is a top plan view of a vibration isolation cradle for the unit of the present invention.
Figure 12B:
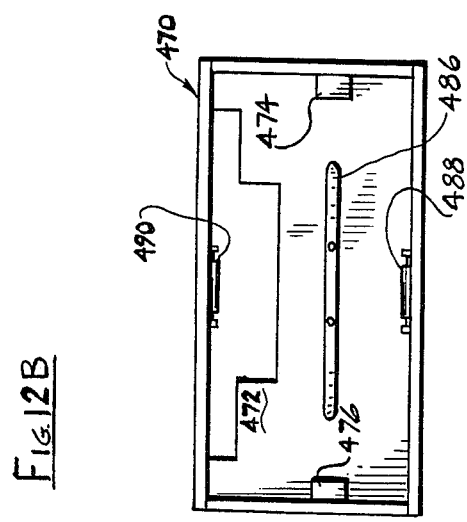

As previously indicated, the entire magnetic disc unit is housed in a support cradle. That cradle 470 is shown in FIGURES 12A and 12B; and FIGS. 12A, 12B, 13A and 13B show vibration reducing features of the mounting cradle as well. The magnetic disc unit fits and is housed in the interior 472 of cradle 470. Cradle 470 has a pair of internal asymmetric guide rails 474, 476 which mate with asymmetric grooves (not shown) on housing 312 to guide the unit into proper position in the cradle to mate with electrical connectors (not shown) in the rear of the cradle. A known gear mechanism in front cover 318, which is actuated by handle 320, brings pinion gears 478, 480 into locking engagement with toothed rack segments 482, 484 to lock the disc unit into the cradle. The gears engage the rack segments to urge the disc unit toward the rear of the cradle against leaf spring 486, whereby vibration front to back is reduced. The front cover, handle, and gear mechanism and basic cradle structure are known, such as Model 6400 series tape units available from Raymond Engineering Inc., the assignee hereof.

Sets of upper and lower rollers 488, 490 in the upper and lower plate surfaces of the cradle narrow the height of the opening into the cradle to provide a slight interference fit between the cradle rollers and the upper and lower surfaces of the disc unit. The disc unit housing then causes the upper and lower surfaces of the cradle to bow outward slightly, whereby a spring action and spring forces are generated to further secure the disc unit against vibrations and prevent the cradle from going into a resonant mode. The rollers also serve as entry guides to facilitate entry of the disc unit housing into the cradle.

One additional vibration isolation feature is shown in FIG. 13B wherein elastomeric or soft plastic elements 492, 494 are positioned on the rear of the front cover 318 above and below the gears 478, 480. Elements 492, 494 engage rack segments 482, 484 to further grip, and secure the parts and provide additional vibration isolation.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A magnetic disc memory unit comprising:
    housing means;
    disc support means for receiving and holding at least one magnetic memory disc, said disc support means being rotatably mounted in said housing means;
    drive means in said housing means for rotatably driving said disc support means;
    read/write head means for interacting with memory discs to be supported on said disc support means;
    rotary support arm means mounted in said housing means, said read/write head means being mounted on said rotary arm means;
    stepper motor means mounted in said housing means for driving said rotary support arm means over an arc of travel relative to a magnetic memory disc mounted on said disc support means, the output of said stepper motor means being in arcs of rotary motion;
    a first rotary pulley means connected to said output of said stepper motor means;
    a second rotary pulley means rotatably connected to said first rotary pulley means by a belt, said second rotary pulley means having a larger diameter than said first rotary pulley means so as to increase the ratio between the rotary motion of said rotary support arm means and said stepper motor means; and
    split belt means connected between said support arm means and said second rotary pulley means to move said support arm means and the read/write head means mounted thereon in steps of rotary movement.

2. The unit of claim 1 wherein:
    said disc support means includes a rotary table made of a first material connected to a rotary mounted spindle made of a second material, said rotary table and said spindle being joined by a cryogenic joint.

3. The unit of claim 2 wherein:
    said rotary table and said spindle have different coefficients of thermal expansion, the coefficient of thermal expansion of said rotary table being substantially the same as the coefficient of thermal expansion of the memory discs to be mounted on said rotary table.

4. The unit of claim 2 wherein:
    said rotary table is made of the material from which the memory discs are made.

5. The unit of claim 2 wherein:
    said rotary table is aluminum and said spindle is steel.

6. The unit of claim 1 wherein:
    said drive means includes a rotary spindle supported in bearing means; and
    preload means to maintain said bearing means in operating position.

7. The unit of claim 1 including:
    electro-optic sensor means in said housing means for generating an optical path;
    flag means on said rotary support arm means for interrupting said optical path of said electro-optic sensor means when said rotary support arm means and said read/write head means are in a retracted position whereby said electro-optic sensor means generates an output signal to terminate operation of said stepper motor means.

8. The unit of claim 1 wherein:
    said disc supporting means including a skirt, said skirt being comprised of a magnetic material, said skirt having a preselected gap therein defining an index notch;
    and wherein said unit further includes:
    zero index magnetic sensor means which interacts with said skirt to sense the change in magnetic path at said index notch.

9. The unit of claim 1 including:
    grounding means to ground said disc support means to said housing means.

10. The unit of claim 9 wherein:
    said disc support means includes a rotary table and a rotary spindle;
    said grounding means including electrically conductive ball means and electrically conductive spring means between said spindle means and said housing, said spring means urging said ball means against said housing.

11. The unit of claim 1 wherein said rotary support arm means includes:

an arm;
a support shaft, said arm being mounted on said support shaft;
foot pad means mounted in said housing and supported by said support shaft; and
bearing means between said arm and said support shaft for mounting said arm on said support shaft.

12. The unit of claim 11 wherein:
said arm has a depending sleeve;
said bearing means includes first and second bearings;
said first bearing being supported on said foot pad means;
said second bearing being spaced from said first bearing;
said depending sleeve being held between said first and second bearings; and
means to impose a preload on said bearings and said depending sleeve.

13. The unit of claim 1 including:
latch means on the outside of said housing means for locking and unlocking said housing means from a cradle which receives said housing means; and
switch means cooperating with said latch means whereby power to said unit is shut down when said latch means is actuated.

14. The unit of claim 1 including:
strengthening ribs on said rotary support arm means.

15. The unit of claim 1 including:
counterweight means attached to said support arm means for static balance thereof.

16. The unit of claim 15 including:
mounting means for mounting weights on said support arm means for dynamic balance.

17. The unit of claim 1 wherein said read/write head means comprises:
at least one magnetic pick-up head;
a flexure beam having said magnetic pick-up head attached to a first end thereof; and
a support plate, said support plate being attached to a second end of said flexure beam, said support plate also being attached to said rotary support arm means.

18. The unit of claim 17, including:
means for dynamically balancing said read/write head means.

19. The unit of claim 18, wherein said means for dynamically balancing said read/write head means includes:
weight bars on the upper surface of said head means, said bars defining a mounting channel therebetween;
said flexure beam extending from said rotary arm means and being attached to said head means in said mounting channel.

20. The unit of claim 19 wherein:
the center of gravity of said head unit in at least two mutually perpendicular directions is at the point of attachment of said flexure member to said head means.

21. The unit of claim 1 including:
wing means on said rotary support arm means for supporting said split belt means thereagainst;
said split belt means extending between said wing means and said pulley means.

22. The unit of claim 21 wherein:
said split belt means includes a first single strand section and a second double strand section, said double strand section defining an intermediate space between the strands thereof in which the single strand section travels;
said double strand section being attached to and wrapped around one end of said wing means and being wrapped around part of said pulley means;
said singe strand section being wrapped around part of said pulley means, passing through said intermediate space in said double strand section and extending around and being attached to a second end of said wing means.

23. The unit of claim 22 including:
means for tensioning said split belt means.

24. The unit of claim 23 wherein said tensioning means includes:
a split end segment of one end of said wing means; and
spring means urging said split end outwardly from said wing means to impose a tension load on said split belt means.

25. The unit of claim 24 including:
alignment means to keep said split end segment aligned with said one end of said wing means.

26. The unit of claim 1 wherein:
said housing means is hermetically sealed.

27. The unit of claim 26 including:
an inert gas in said hermetically sealed housing means.

28. The unit of claim 27 including:
filter means in said housing means for filtering said inert gas.

29. The unit of claim 1 including:
mounting cradle means for receiving said housing means;
roller means in said cradle means to establish an interference fit between upper and lower surfaces of said housing means and said mounting cradle;

30. The unit of claim 29 further including:
means for locking said housing means in said cradle; and
leaf spring means in said mounting cradle, said locking means urging said housing means against said leaf spring means.

31. The unit of claim 29 including:
elastomeric shock absorbing means between said housing and said cradle.

32. A magnetic disc memory unit comprising:
housing means;
disc support means for receiving and holding at least one magnetic memory disc, said disc support means being rotatably mounted in said housing means;
drive means in said housing means for rotatably driving said disc support means;
read/write head means for interacting with memory discs to be supported on said disc support means;
rotary support arm means mounted in said housing means, said read/write head means being mounted on said rotary arm means;
stepper motor means mounted in said housing means for driving said rotary support arm means over an arc of travel relative to a magnetic memory disc mounted on said disc support means, the output of said stepper motor means being in arcs of rotary motion;
rotary pulley means connected to said output of said stepper motor means, said rotary pulley means increasing the ratio between the rotary motion of said rotary support arm means and said stepper motor means;

split belt means connected between said support arm means and said rotary pulley means to move said support arm means and the read/write head means mounted thereon in steps of rotary movement; and wherein said read/write head means comprises;

at least one magnetic pick-up head;

a flexure beam having said magnetic pick-up head attached to a first end thereof; and a support plate, said support plate being attached to a second end of said flexure beam, said support plate also being attached to said rotary support arm means; and further including means for supporting said magnetic head when said read/write head means is in retracted position; and means for raising and lowering said flexure beam as said read/write head means moves relative to said disc support means.

33. The unit of claim 32 wherein said means for raising and lowering said flexure beam includes:

cam follower means on said flexure beam; and a step on said means for supporting said magnetic head wherein said cam follower contacts said step and raises said flexure beam in a first direction and lowers said flexure beam in a second opposite direction.

34. The unit of claim 33 wherein:

said cam follower means has a spherical or semispherical shape.

35. A magnetic disc memory unit comprising:

housing means;

disc support means for receiving and holding at least one magnetic memory disc, said disc support means being rotatably mounted in said housing means;

drive means in said housing means for rotatably driving said disc support means;

read/write head means for interacting with memory discs to be supported on said disc support means;

rotary support arm means mounted in said housing means, said read/write head means being mounted on said rotary arm means;

a stepper motor means mounted in said housing means for driving said rotary support arm means over an arc of travel relative to a magnetic memory disc mounted on said disc support means, the output of said stepper motor means being in arcs of rotary motion;

rotary pulley means connected to said output of said stepper motor means, said rotary pulley means increasing the ratio between the rotary motion of said rotary support arm means and said stepper motor means;

split belt means connected between said support arm means and said rotary pulley means to move said support arm means and the read/write head means mounted thereon in steps of rotary movement;

said drive means including a rotary spindle supported in bearing means;

preload means to maintain said bearing means in operating position; and wherein said preload means includes elastomeric "O" ring means to which a preload is applied.

36. A magnetic disc memory unit comprising:

housing means;

disc support means for receiving and holding at least one magnetic memory disc, said disc support means being rotatably mounted in said housing means;

drive means in said housing means for rotatably driving said disc support means;

read/write head means for interacting with memory discs to be supported on said disc support means;

rotary support arm means mounted in said housing means, said read/write head means being mounted on said rotary arm means;

stepper motor means mounted in said housing means for driving said rotary support arm means over an arc of travel relative to a magnetic memory disc mounted on said disc support means, the output of said stepper motor means being in arcs of rotary motion;

rotary pulley means connected to said output of said stepper motor means, said rotary pulley means increasing the ratio between the rotary motion of said rotary support arm means and said stepper motor means;

split belt means connected between said support arm means and said rotary pulley means to move said support arm means and the read/write head means mounted thereon in steps of rotary movement;

means for transforming said disc supporting means driving means to a power generator for producing electrical power to power said stepper motor means whereby said rotary support arm means and said read/write head means are moved into a retracted position and stored in the event of power interruption to said unit; and storing and protecting means for storing and protecting said read/write head means, said read/write head means being supported by said storing and protecting means when said read/write head means is moved into said fully retracted position.

37. A magnetic disc memory unit comprising:

housing means;

disc support means for receiving and holding at least one magnetic memory disc, said disc support means being rotatably mounted in said housing means;

drive means in said housing means for rotatably driving said disc support means;

read/write head means for interacting with memory discs to be supported on said disc support means;

rotary support arm means mounted in said housing means, said read/write head means being mounted on said rotary arm means;

stepper motor means mounted in said housing means for driving said rotary support arm means over an arc of travel relative to a magnetic memory disc mounted on said disc support means, the output of said stepper motor means being in arcs of rotary motion;

rotary pulley means connected to said output of said stepper motor means, said rotary pulley means increasing the ratio between the rotary motion of said rotary support arm means and said stepper motor means;

split belt means connected between said support arm means and said rotary pulley means to move said support arm means and the read/write head means mounted thereon in steps of rotary movement;

said drive means including a rotary spindle supported in bearing means;

preload means to maintain said bearing means in operating position; and wherein said bearing means includes first and second bearing means spaced apart;

spring means urging said first and second bearing means apart;

elastomeric "O" means adjacent and in contact with one of said first and second bearing means; and means to impose a preload on said "O" ring means.

38. A magnetic disc memory unit comprising:

housing means;

disc support means for receiving and holding at least one magnetic memory disc, said disc support means being rotatably mounted in said housing means;

drive means in said housing means for rotatably driving said disc support means;

read/write head means for interacting with memory discs to be supported on said disc support means;

rotary support arm means mounted in said housing means, said read/write head means being mounted on said rotary arm means;

stepper motor means mounted in said housing means for driving said rotary support arm means over an arc of travel relative to a magnetic memory disc mounted on said disc support means, the output of said stepper motor means being in arcs of rotary motion;

rotary pulley means connected to said output of said stepper motor means, said rotary pulley means increasing the ratio between the rotary motion of said rotary support arm means and said stepper motor means;

split belt means connected between said support arm means and said rotary pulley means to move said support arm means and the read/write head means mounted thereon in steps of rotary movement, and wherein said rotary support arm means includes;

an arm;

a support shaft, said arm being mounted on said support shaft;

foot pad means mounted in said housing and supported by said support shaft; and bearing means between said arm and said support shaft for mounting said arm on said support shaft; and wherein said arm has a depending sleeve;

said bearing means includes first and second bearings;

said first bearing being supported on said foot pad means;

said second bearing spaced from said first bearing;

said depending sleeve being held between said first and second bearings; and means to impose a preload on said bearings and said depending sleeve;

wherein said preload means includes;

elastomeric "O" ring means in contact with said second bearing; and means to load said "O" ring means against said second bearing to urge said bearings and sleeve together.

39. A magnetic disc memory unit comprising:

housing means;

disc support means for receiving and holding at least one magnetic memory disc, said disc support means being rotatably mounted in said housing means;

drive means in said housing means for rotatably driving said disc support means;

read/write head means for interacting with memory discs to be supported on said disc support means;

rotary support arm means mounted in said housing means, said read/write head means being mounted on said rotary arm means;

stepper motor means mounted in said housing means for driving said rotary support arm means over an arc of travel relative to a magnetic memory disc mounted on said disc support means, the output of said stepper motor means being in arcs of rotary motion;

split belt means connected between said support arm means and the output of said stepper motor means to move said support arm means and the read/write head means mounted thereon in steps of rotary movement;

said drive means including a rotary spindle supported in bearing means;

preload means to maintain said bearing means in operating position;

said bearing means including first and second bearing means spaced apart;

spring means urging said first and second bearing means apart;

elastomeric "O" ring means adjacent and in contact with one of said first and second bearing means; and means to impose a preload on said "0" ring means.

40. A magnetic disc memory unit comprising:

housing means;

disc support means for receiving and holding at least one magnetic memory disc, said disc support means being rotatably mounted in said housing means;

drive means in said housing means for rotatably driving said disc support means;

read/write head means for interacting with memory discs to be supported on said disc support means;

rotary support arm means mounted in said housing means, said read/write head means being mounted on said rotary arm means;

stepper motor means mounted on said housing means for driving said rotary support arm means over an arc of travel relative to a magnetic memory disc mounted on said disc support means, the output of said stepper motor means being in arcs of rotary motion;

split belt means connected between said support arm means and the output of said stepper motor means to move said support arm means and the read/write head means mounted thereon in steps of rotary movement between a fully retracted position and a preselected position over a magnetic memory disc mounted on said disc support means;

means for transforming said disc supporting means driving means to a power generator for producing electric power to power said stepper motor means whereby said head carriage means and said read/write head means are moved into said fully retracted position during power interruption to said unit; and storing and protecting means for storing and protecting said read/write head means, said read/write head means being supported by said storing and protecting means when said read/write head means is moved into said fully retracted position.

41. A magnetic disc memory unit comprising:

housing means;

disc support means for receiving and holding at least one magnetic memory disc, said disc support means being rotatably mounted in said housing means;

drive means in said housing means for rotatably driving said disc support means;

read/write head means for interacting with memory discs to be supported on said disc support means wherein said read/write head means comprises at least one magnetic pick-up head, a flexure beam having said magnetic pick-up head attached to a first end thereof, and a support plate, said support plate being attached to a second end of said flexure beam, said support plate also being attached to said rotary support arm means;

rotary support arm means mounted in said housing means, said read/write head means being mounted on said rotary arm means;

stepper motor means mounted in said housing means for driving said rotary support arm means over an arc of travel relative to a magnetic memory disc mounted on said disc support means, the output of said stepper motor means being in arcs of rotary motion;

split belt means connected between said support arm means and the output of said stepper motor means to move said support arm means and the read/write head means mounted thereon in steps of rotary movement between a fully retracted position and a preselected position over a magnetic memory disc mounted on said disc support means;

means for supporting said magnetic head when said read/write head means is in a retracted position; and means for raising and lowering said flexure beam as said read/write head means moves relative to said disc support means; and wherein said means for raising and lowering said flexure beam includes;

cam follower means on said flexure beam; and a step on said means for supporting said magnetic head wherein said cam follower contacts said step and raises said flexure beam in a first direction and lowers said flexure beam in a second opposite direction.

* * * * *